Patented Oct. 28, 1924.

1,512,979

UNITED STATES PATENT OFFICE.

HEINRICH FRERICHS, OF HAMBURG, GERMANY.

PROCESS FOR THE PRODUCTION OF A SUBSTANCE RESEMBLING EBONITE.

No Drawing.   Application filed September 24, 1923.   Serial No. 664,595.

*To all whom it may concern:*

Be it known that I, HEINRICH FRERICHS, a citizen of the German Republic, and a resident of Hamburg, Germany, have invented a new and useful Improved Process for the Production of a Substance Resembling Ebonite, of which the following is a specification.

My invention concerns a process for the production of an ebonite-like substance from blood, in which process the blood mixed with a binding medium or agglutinant such as gum-like substance or gum-resin, and heated, is hardened with formaldehyde. As compared with the known process of this kind, the present process is characterized by the circumstance that the product obtained on heating the blood with gum or gum-resins, and subsequently treating it with formaldehyde, is dried and ground, whereupon it is rendered plastic by the addition of a mixture of grease, caustic alkali, and waterglass under pressure, in a flame. This treatment is for the purpose of giving to the final product, on the one hand, the requisite elasticity, and on the other hand, strength.

The process, illustrated by an example of execution, may be described as follows:—

100 parts of fresh blood are mixed with about 5 parts of a 5% tragacanth solution and heated to the boiling point. In place of tragacanth, other suitable substances, such as gum-like substances, gum-resins, or the like, may be used.

Then about one part of a 40% formaldehyde solution is added. The cake thus formed is pressed in order to remove water therefrom as far as possible. The residue is dried by application of heat and is then broken up and ground, so that a more or less fine powder results. 100 parts of this powder are mixed with 10 to 15 parts of a mixture consisting of grease or fat, waterglass, and caustic potash. This mixture may, for instance, be composed of ¼ kilo of beef-suet, ¼ kilo of waterglass, and 100 grms. of a 15% caustic soda solution. After the powder has been carefully mixed with this solution, the product obtained is pressed with the application of high pressure and heat, whereby a preparation is obtained which has approximately the hardness, elasticity, and appearance of ebonite (or vulcanite).

This product may be worked in any desired manner, by planing, cutting, milling, drilling and polishing.

I claim:

1. The process for the production of an ebonite-like substance from blood, consisting in mixing the blood with a binding medium, hardening the mixture by formaldehyde, drying and grinding the product obtained, and mixing the powder with grease, waterglass, and caustic alkali, as set forth.

2. The process for the production of an ebonite-like substance from blood, consisting in mixing the blood with an agglutinant, hardening the mixture by a formaldehyde-solution, drying and grinding the product obtained, and mixing the powder with grease, waterglass, and caustic alkali, as set forth.

3. The process for the production of an ebonite-like substance from blood, consisting in mixing the blood with a binding medium, hardening the mixture by formaldehyde, drying the cake obtained, breaking it up, grinding the pieces, mixing the powder with a fat, waterglass, and caustic alkali, heating this mixture, and subjecting it at the same time to pressure, as set forth.

4. The process for the production of an ebonite-like substance from blood, consisting in mixing fresh blood with an agglutinant, hardening the mixture by a solution of formaldehyde, pressing the cake obtained, drying it, breaking it into pieces, grinding them, mixing the powder with a mixture composed of a grease, waterglass, and caustic potash, and subjecting the product obtained to heat and pressure, as set forth.

5. The process for the production of an ebonite-like substance from blood, consisting in mixing about 100 parts of fresh blood with about 5 parts of a 5% tragacanth-solution, heating the mixture to the boiling point, adding about 1 part of a 40% formaldehyde-solution, pressing the cake obtained to remove the water contained therein, drying it, breaking it up, and grinding the pieces, and mixing the powder with from 10 to 15 parts of a mixture consisting of a fat, waterglass, and caustic alkali, as set forth.

6. The process for the production of an ebonite-like substance from blood, consisting in mixing about 100 parts of fresh blood with about 5 parts of a 5% tragacanth-solution heating the mixture to the boiling point, adding about 1 part of a 40% formaldehyde-solution, pressing the cake obtained to remove the water contained therein, drying it, breaking it up, and grinding the pieces, and mixing the powder with from 10 to 15 parts of a mixture composed of about ¼ kilo of beef-suet, ¼ kilo of waterglass, and 100 gramms of a 15% solution of caustic potash, and subjecting the product obtained to heat and pressure, as set forth.

In testimony whereof I affix my signature in presence of two witnesses.

HEINRICH FRERICHS.

Witnesses:
K. JOSMEL,
E. KASPAREH.